United States Patent

[11] 3,608,009

| | | | | |
|---|---|---|---|---|
| [72] | Inventor | Pushpkumar Dewanmal Changani<br>Newport, England | | |
| [21] | Appl. No. | 784,722 | | |
| [22] | Filed | Dec. 18, 1968 | | |
| [45] | Patented | Sept. 21, 1971 | | |
| [73] | Assignee | Monsanto Chemicals Limited<br>London, England | | |
| [32] | Priority | Dec. 21, 1967 | | |
| [33] | | Great Britain | | |
| [31] | | 58,060/68 | | |

[54] METHOD OF FIBRILLATING A FOAMED EXTRUDATE COMPRISED OF TWO HEAT SHRINKABLE POLYMERS
1 Claim, 9 Drawing Figs.

[52] U.S. Cl. .................................................... 264/51,
161/173, 161/177, 260/2.5 E, 264/147, 264/171,
264/321, 264/DIG. 8, 264/DIG. 26, 264/DIG. 47,
264/DIG. 71
[51] Int. Cl. ........................................................ B29d 27/00,
D02g 3/04
[50] Field of Search ............................................ 264/51, 41,
53, 54, 321, 171, 174, DIG. 8, DIG. 47, DIG. 71,
DIG. 26, 147; 260/2.5 E; 161/173, 177

[56] References Cited
UNITED STATES PATENTS

| | | | |
|---|---|---|---|
| 3,336,174 | 8/1967 | Dyer et al. ..................... | 264/DIG. 8 |
| 3,403,203 | 9/1968 | Schirmer ....................... | 264/321 X |

FOREIGN PATENTS

| | | | |
|---|---|---|---|
| 401,817 | 2/1965 | Japan ............................ | 264/321 |
| 1,098,770 | 1/1968 | Great Britain ................. | 264/321 |

Primary Examiner—Philip E. Anderson
Attorneys—J. Bowen Ross, Jr., Russell E. Weinkauf and John D. Upham ABSTRACT: In a process for the production of a textured fiber assembly, which includes a three-dimensional structure of interconnected fiber elements; a foamed thermoplastic material comprising at least two different heat shrinkable polymers is drawn so that it becomes oriented essentially in one direction whereupon the walls of the drawn foamed material are converted into a three-dimensional structure of interconnecting fiber elements after which the structure is treated so that a portion of the fiber elements adopt an inclined attitude.

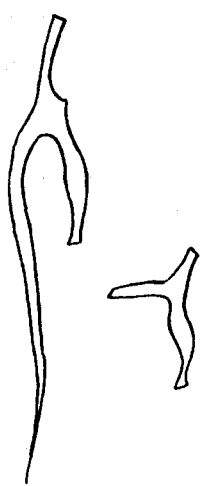
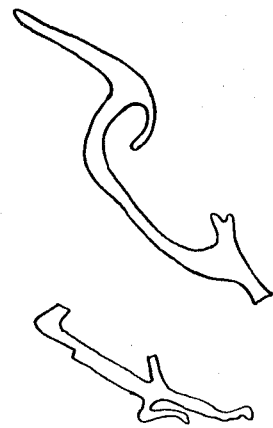
*Fig. I.*  *Fig. II.*

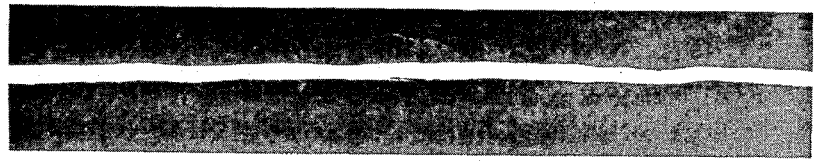
Fig. III.
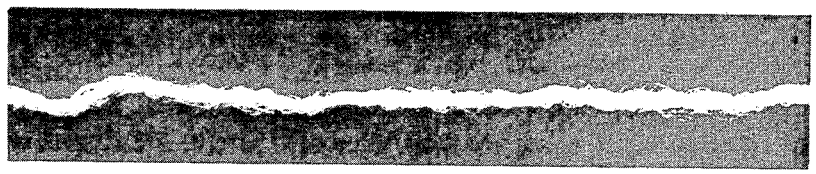
Fig. IV.
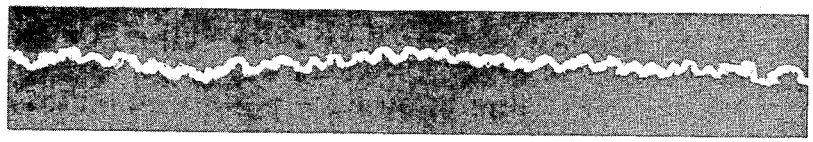
Fig. V.
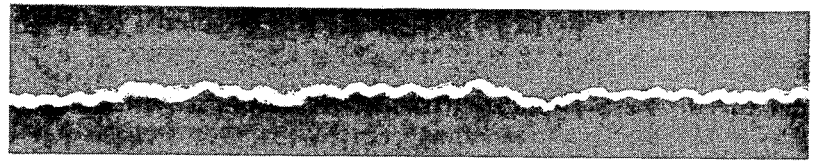
Fig. VI.
INVENTOR.
PUSHPKUMAR DEWANMAL CHANGANI

*Fig. VII.*
*Fig. VIII.*

```
┌─────────────────────────────────────────────────────┐
│ FORMING A CELLULAR THERMOPLASTIC MATERIAL COMPRISED │
│ OF AT LEAST TWO HEAT SHRINKABLE POLYMERS            │
└─────────────────────────────────────────────────────┘
                          │
                          ▼
┌─────────────────────────────────────────────────────┐
│     DRAWING THE MATERIAL FOR POLYMER ORIENTATION    │
└─────────────────────────────────────────────────────┘
                          │
                          ▼
┌─────────────────────────────────────────────────────┐
│ CONVERTING THE CELL WALLS INTO A THREE-DIMENSIONAL  │
│ STRUCTURE OF INTERCONNECTED FIBER ELEMENTS BY       │
│ FIBRILLATION                                        │
└─────────────────────────────────────────────────────┘
                          │
                          ▼
┌─────────────────────────────────────────────────────┐
│ HEAT TREATING THE STRUCTURE TO DIFFERENTIALLY SHRINK│
│ THE POLYMERS SO THAT A PORTION OF THE FIBER ELEMENTS│
│ ADOPT AN INCLINED ATTITUDE                          │
└─────────────────────────────────────────────────────┘
```

FIG. IX

METHOD OF FIBRILLATING A FOAMED EXTRUDATE COMPRISED OF TWO HEAT SHRINKABLE POLYMERS

This invention relates to fiber assemblies, particularly to certain novel textured fiber assemblies, as well as to a process for their production. The invention is an improvement in or modification of that described in British Pat. Specification No. 29324/64 (cognated with 48527/64).

British Pat. Specification No. 29324/64 (cognated with 48527/64), hereinafter referred to as the parent specification, describes a process for the production of a fiber assembly which comprises drawing an extruded foamed thermoplastic material so that it becomes orientated essentially in one direction and subjecting the drawn foamed material to forces such that the walls of the foam are broken down and converted into a three-dimensional structure of interconnected fiber elements. The fiber assemblies produced are strong and in general very flexible, and although this flexibility is often desirable, for instance where good draping properties are needed, the fiber assemblies can in consequence be too limp and lack the texture, bulk and stretch properties desirable for certain applications. There has now been developed a new process for producing a fiber assembly that possesses an improved texture and increased bulk, and moreover often has an increased elasticity.

The present invention comprises a process for the production of a textured fiber assembly, which comprises drawing an extruded foamed thermoplastic material so that it becomes orientated essentially in one direction and subjecting the drawn foamed material to forces such that the walls of the foam are broken down and converted into a three-dimensional structure of interconnecting fiber elements and this structure is treated so that a proportion of the fiber elements adopt an inclined attitude as herein defined.

The phase "adopt an inclined attitued" refers to the behavior of the fiber elements when the assembly without twist is subjected to tension in the direction in which the original foamed material was drawn, and allowed to relax while supported on a smooth horizontal surface. The tension is sufficient to impart a parallel alignment to as many as possible of the fiber elements without permanently drawing or breaking them or rupturing their interconnections, and on relaxation a proportion of the fiber elements adopt an attitude inclined to the direction of the tension. As a result, an improved texture and increased bulk are imparted to the fiber assembly as a whole. It will be understood that the fiber assemblies described in the parent specification can be "teazed" out to give bulkier and lighter-weight products, but the effect of such a teazing process is largely destroyed on tension and relaxation in this way and it does not form part of the present invention.

Also part of the invention is a new textured fiber assembly that is a three-dimensional structure of interconnecting fiber elements, a proportion of the fiber elements adopting an inclined attitude as herein defined and some of them having cross sections that are branched.

Fiber elements are referred to and not fibers because in general the elements in question are essentially interconnecting in three-dimensions. Accordingly the number of loose "ends" in the fiber assembly is normally low, and the assembly contains few "fibers" as such, that is to say fibers each of which has two ends.

British Pat. Specification No. 43936/64 (cognated with No. 48726/64) described a process for the production of a yarn, which comprises drawing a strand or ribbon of an extruded foamed thermoplastic material so that it becomes orientated essentially in the direction of extrusion and subjecting the drawn foamed material to forces such that the walls of the foam are broken down and converted into a three-dimensional structure of interconnected fiber elements. The present invention is particularly applicable to the production of a yarn in this way and treating it so that a majority of the fiber elements adopt an inclined alignment as herein defined.

Preferably the number of fiber elements having an inclined alignment is greater than 60% of the total; the number can be up to 100% of the total, for example from 70% to 95%.

The texturing effect preferably arises from the presence of fiber elements that have an inherent tendency to bend or curl and hence adopt an inclined alignment. Alternatively or additionally, texturing can be present as a consequence of the presence in the fiber assembly of fiber elements shorter than their immediate interconnected neighbors, for example as a result of a differential dimensional change, so that these neighboring elements are pulled into an inclined alignment. Fiber elements having an inherent tendency to bend or curl preferably have a radius of curvature that is relatively small. For example most of such elements (for instance 60% or more) can have a radius of curvature less than 0.3 inch, especially good results being obtained if most of them have a radius of curvature from 0.05 to 0.2 inch. These measurements should be made after the fiber assembly has been subjected to tension and allowed to relax as defined above. Individual fiber elements can be inclined to the direction of tension at any angle in three dimensions, but very often for a majority of fiber elements the angle of inclination is from 20° to 90°, for instance from 30° to 80°. Very often there is a distribution of angles among neighboring fiber elements so that these are inclined to and sometimes cross one another. Such a distribution of angles can be random, so that no particular arrangement of the fiber elements is discernible, or it can be more regular, for example so that the fiber elements appear to be arranged in sinuous chains. In other instances neighboring fiber elements in a local area of the assembly can be substantially parallel to one another (for example there can be a "bundle" of elements at this area) while inclined to those in another part of the assembly, and preferably such variation in inclination is repetitive so that the assembly as a whole has crimped configuration. Such a crimped configuration can for example be in the form of a simple bend or curl, it can be sinusoidal or zigzag in two or three dimensions or it can have a helical shape. Very often more than one kind of crimped configuration can be present in the fiber assembly.

Fiber elements that have a cross section (at right angles to the major axis of the fiber element) that is branched are present in the fiber assembly because the fiber elements are obtained from an orientated foamed thermoplastic material by the partial disintegration or break down of the walls of the cells or pores making up the foamed structure. The fiber elements accordingly consist of the remains of the cell walls, and because of this possess certain characteristic features as described below. Fiber elements that have cross sections that are branched are derived from parts of the walls of several cells that were present in the original orientated foamed material, and the "branch" occurs where a fragment of the wall of one cell is joined to fragments of the walls of an adjoining cell or cells. In the simplest instance a branched cross section of a fiber element can be termed "trilobate," because it consists of three lobes or arms, as is exemplified in the cross sections shown in FIG. 1, which are taken at right angles to the major axis of the fiber elements. Related but more complicated branched cross sections can consist of two or more "trilobate" cross sections joined together, as for example shown in FIG. II. Cross sections such as are for example exemplified in FIGS. I and II are those which can exist at one point along the major axis of a fiber element, and a fiber element does not necessarily possess a constant cross section along its length. Not only does the cross section usually change along the length of a fiber element, but the fiber element itself is not straight and parallel to the fiber assembly as a whole. Accordingly a series of cross sections across a fiber assembly taken at right angles to the direction of production of the fiber assembly will shown the cross section of a given fiber element in a number of different forms.

In a typical cross section of a fiber assembly the number of cross sections of fiber elements which are branched may be a minority, such as 30% or 40% or less, but nonetheless their presence (even to the extent of from only 5% to 10% of the total) contributes a distinctive character to the fiber assembly. In certain instances the proportion of branched cross sections can be high (such as 60% or 70%), but in many cases it will for example be in the range of 5% or slightly less to 50% for instance from 10% to 40%, such as about 20%.

Because of the way in which they have been formed the fiber elements are in the main "elongated" in cross section. Very often a cross section of a fiber element contains at least one pair of substantially parallel sides, although at least in the instance of the fiber elements having a branched cross section these parallel sides will usually be curved. Other cross sections may be polygonal, for example quadrilateral, and can be rectangular or essentially rectangular; more than four sides can however be present. In considering a cross section of a fiber element the longer (or longest) dimension is taken as the breadth and the smaller (or smallest) dimension is taken as the thickness. In general terms the elongated cross sections can have a breadth to thickness ratio of from 3 to 1 to 20 to 1 or even more, such as perhaps 30 to 1. A proportion (perhaps up to 50% of the total) of the cross sections can be compact, for example essentially square; often the number of compact cross sections is small.

A further characteristic of the fiber elements of the fiber assemblies of the invention can be expressed as their surface area in square meters per gram. This can for example range from 0.04 to 1.5, particularly from 0.05 to 1.0. Useful fiber assemblies may for example contain fiber elements having surface areas of between 0.1 to 0.5, such as for instance about 0.2 or 0.3. In certain instances the surface area can be higher, such as up to about 2.0 square meters per gram. The surface areas can be controlled by operation of the process of production of the fiber assemblies, for instance a higher density foamed material normally results in a fiber assembly having a lower surface area.

The thickness of the fiber element is often in the range of from 0.001 to 0.004 or 0.005, for example between 0.002 and 0.003 inch; it can for instance be between 0.0004 and 0.002 inch, such as about 0.0006 or about 0.001 inch.

The average distance between points of interconnection as referred to above can be for example from 5 or 10 to 750 times the average thickness of the fiber element or slightly more, for instance up to 1,000 times the average thickness. For example, useful fiber assemblies are obtained when the average distances between points of interconnection of fiber elements are from 20 to 500 times the average fiber element thickness, such as from 50 to 300 times. A distance of about 100 or 200 times the average thickness of the major fiber elements is often characteristic. In absolute terms the distance between points of interconnection is often in the range of 0.01 to 0.5 inch, such as from 0.02 to 0.3 inch, for instance from 0.05 to 0.1 or 0.2 inch.

It has been mentioned that the invention is particularly applicable to the production of a fiber assembly that is a textured yarn. The yarns can be produced continuously and they can in any event be obtained in any length convenient for the intended purpose. Their cross sections are those usual for yarns. In special instances, for example where the yarn is to be subsequently twisted, the yarn cross section can be more elongated, for instance it can be an elongated rectangle, and the yarn then can be in the form of a ribbon or strip, normally a narrow one. Such a ribbon or strip might for example be up to one-fourth inch wide. Normally, however the yarn has a more compact cross section, which can for example be a circular or similar cross section and can vary within wide limits; in general it will be at least 0.005 inch in diameter and can for instance be from 0.01 to 0.15 inch or more, such as from 0.22 to 0.05 or 0.1 inch. Thicker yarns can have a diameter up to perhaps 0.25 inch. Yarns having diameters in the upper part of this range are useful in the production of certain coarse fiber or yarn products. In terms of denier, that is to say the weight in grams of 9000 meters of yarn, the yarns of the invention can for instance have values in the range of 15 to 25,000, for example in the range of 100 to 1,000, such as 200 to 500.

Where a textured yarn of the invention has been twisted, the common axis of the helices is normally coincident with the axis of the yarn, and the helices can for example have between one-half or 1 and 60 turns per inch, for example from 2 to 50 turns per inch (such as from 4 to 6 to 25 turns per inch). Generally a lower degree of twist is desirable where the yarn is of high denier than where the denier is low. For example, for a yarn of 50 denier about 50 turns per inch can give good results whereas about 8 turns per inch is often preferred for a 1000 denier yarn. The twisted yarns have a cross section that is substantially circular. A yarn having a low degree of twist is in general softer than one where the degree of twist is high. Twisting can be carried out in any convenient way, and it can be performed as the extruded material is partially disintegrated or as a separate operation before or after the texturing treatment. In some instances the fibrillation and twisting procedures can be combined together in a single step. One yarn can be twisted to give a one-ply twisted yarn, or two or three or more yarns can be produced and twisted together to give yarns consisting of several plies. The twisted yarns can if necessary be wound under tension as in the conventional practice.

The production of yarns by the process of the invention also includes a modification in which the yarns are produced by cutting or dividing up a band or web of the appropriate three-dimensional structure of interconnected fiber elements, for example the fiber assemblies described in British Pat. Specifications Nos. 29324/64 and 48527/64. In this modification the drawn foamed material will of course have a cross section that is greater than that of the desired yarn, the drawn material is broken down and converted into a three-dimensional structure of interconnected fiber elements, and this structure is divided up longitudinally into a number of yarns having the required cross sections. Yarns produced in this way can for example usefully be twisted together as described in the preceding paragraph.

The three-dimensional textured fiber assemblies also include materials that are sometimes termed nonwoven fabrics, and although they can be of indefinite length their width (the longer component of the two dimensions of their cross section, the other being the thickness) is normally at least one-half inch, and often rather more, such as 1 inch or more. In this range, such as from 1 or 2 inches to say 5 or 6 inches, the materials can be useful for example as tapes, ribbons, and webbing. The width can be greater, for instance 12 to 18 inches, depending on the ultimate use; the widths usual in the textile industry, for example cloth widths of 27 to 54 inches, can be produced. The thickness can as a minimum be as low as 0.005 inch, although it will normally be more than this, such as more than 0.01 to 0.02 inch. Very often the thickness will be in the range of 0.02 inch to 0.5 inch, for instance from 0.05 to 0.25 inch, such as about 0.1 inch. The thicker fiber assemblies have many uses, for instance in packaging and for insulation. The fiber assembly can as has been stated be produced continuously, and can in any event be obtained in any length convenient for the intended purpose.

Fiber assemblies of the invention are illustrated in the drawings where:

FIG. III is a plan view of an untextured fiber assembly (in the form of a yarn according to British Pat. Specification No. 43936/64);

FIGS. IV and VI are plan views of different fiber assemblies (in the form of textured yarns) according to the invention;

FIG. VII is a magnified representation of the plan view of a portion of the fiber assembly shown in FIG. IV; and FIG. VIII is a magnified view of the same fiber assembly along a cross section taken at right angles to the direction of production.

FIGS. III to VI show the fiber assemblies after being subjected to tension and allowed to relax in the way defined above, and the inclined alignment of a very large proportion of the fiber elements is readily apparent in FIGS. IV to VI, in contrast to the substantially parallel alignment of the fiber elements in FIG. III.

FIG. IX is a flow diagram showing the process steps of this invention.

It can be seen from FIG. VII that a large number of the fiber elements are bent, with many of them exhibiting a series of bends in reverse directions along their lengths. There are present both relatively large bends, of radius 0.1 to 0.5 inch, and relatively small ones of radius 0.01 to 0.1 inch. In many cases both sizes of bend are together present in the same fiber element. A large number of interconnections are present, and in relation to the average thickness of the fiber elements, the interconnections are relatively close together. The portions of fiber elements which in FIG. VII appear as ends were not necessarily in that state in the fiber assembly. Some of the ends were formed when the small portion of material was broken away from the fiber assembly for examination, while others are not in fact loose ends at all; they are portions of fiber elements which are curved and whose remaining portions are aligned either directly towards or directly away from the field of view. In FIG. VII the distances between many of the major points of interconnection are about 0.01 inch. FIG. VIII shows the presence of cross sections (about 20% of the total) that are "branched."

The thermoplastic material is one capable of being formed into an extruded foam; it is in practice usually a synthetic material, and one that is fiber-forming. Excellent results are obtained with a thermoplastic synthetic material, for example a polymer or copolymer obtained by polymerisation (which includes copolymerisation) of an ethylenically unsaturated monomer. Such a monomer can be an ethylenically unsaturated hydrocarbon, but it can be for instance a nitrile, such as acrylonitrile or methacrylonitrile; vinyl or vinylidene chloride; a vinyl ester, such as vinyl acetate; or an acrylate ester, such as ethyl acrylate or methyl methacrylate. Where the monomer is a hydrocarbon this can be a mono-olefin, a diene, or a vinyl-substituted benzene, for instance ethylene, propylene, a butylene, a pentene or a hexene; butadiene; or a vinyl-substituted benzene, such as styrene or $\alpha$-methylstyrene. For example the polymer can be polyethylene (low density or high density material), crystalline polypropylene, or polystyrene or a toughened polystyrene. A copolymer can in general be for instance one involving two or more (such as three) of any of the monomers referred to above. A comonomer can for instance be one of a type which will impart a degree of flame-retardance to the copolymer, and an example of such a substance is a vinyl halide, such as vinyl chloride, vinyl bromide or vinylidene chloride. Examples of other comonomers are vinylpyrollidone and a vinylpyridine such as methylvinylpyridine. A copolymer can for example be one derived from two hydrocarbon monomers, such as an ethylene-propylene or styrene-butadiene copolymer; or a hydrocarbon and a different type of monomer, such as an ethylene vinyl acetate copolymer; or a copolymer derived from dissimilar monomers such as for example acrylonitrile and a minor proportion of vinyl acetate. The thermoplastic material can also consist of a mixture of two or more polymers or copolymers; and as will be explained the use of such a mixture is of importance in at least one method of texturing according to this invention. The thermoplastic material can for example comprise a mixture of polyethylene and polypropylene; a mixture of a copolymer of ethylene with a minor amount of vinyl acetate (for instance about 10% to 15% by weight) and polyethylene or polypropylene; a mixture of two copolymers of acrylonitrile with differing amounts of vinyl acetate; a mixture of a copolymer of acrylonitrile with a minor amount of vinyl acetate (in the region for instance of 10% by weight) and polyvinyl chloride; or a mixture of an acrylonitrile-vinyl acetate copolymer and a copolymer of acrylonitrile with methlvinylpyridine. Preferably the polymer is a thermoplastic resin material, but it can be an elastomeric material, for instance a copolymer derived from sufficient of a diene monomer (such as butadiene) to impart some degree of elastomeric properties to the copolymer; natural rubber; or a synthetic rubber such as for instance polybutadiene, styrene-butadiene or acrylonitrile-butadiene rubber. A thermoplastic resin material can be noncrystalline (as in amorphous polystyrene) or crystalline (as in crystalline polyethylene or polypropylene). Other types of synthetic materials that can be employed include polyamides, such as a polycaprolactam; and polyesters, such as of the polyethylene terephthalate type. Where the thermoplastic material is regenerated natural fiber it is preferably one based on cellulose, for example rayon, cellulose acetate, cellulose triacetate or cellulose acetate-butyrate.

The extruded foamed polymeric material can if desired be produced by conventional extrusion techniques. The extruded foamed products of British Pat. Specification Nos. 22745/64 and 28280/64 can also be employed. Where an extruded foamed sheet or board is employed this can vary in width through a broad range, but normally it will be at least 3 or 4 cells "thick," and probably there will be at least 10 cells measured through the thickness of a sheet. In practice the thickness can for instance be between 0.05 and 2 inches, for instance between 0.1 and 1 inch. An extruded sheet or board will often have been made using a slit die; sheet material can also be produced using an annular die by extrusion of a tube of foamed material, which can either be slit longitudinally and opened out into a sheet or collapsed so as to form a sheet of double thickness.

Preferably, as has been mentioned, the foam is in the form of a strand or ribbon so that the ultimate product is a yarn. An extruded strand (which includes a rod) or ribbon can be of virtually any relatively compact cross section, but often the cross section is circular or substantially circular, although it can also be square or rectangular. Where the yarn is for example to be twisted it can if desired have a less compact cross section, and hence the extruded foamed material can (although this is not essential) have a cross section that is a more elongated rectangle or similar shape, and the extruded material can then be a ribbon or strip, although a relatively narrow one. If desired, a suitable strand or ribbon can be obtained by slitting longitudinally a sheet or board of a drawn extruded foamed material. In general, and by way of example, where the extruded strand has a circular or roughly circular cross section the average diameter can be between 0.1 and 1 inch for instance between 0.2 to 0.5 inch.

The density of the foamed material can for instance be between 1 pound and 10 pounds or more per cubic foot, such as from about 2 to 4 or 5 pounds per cubic foot. The fact that the starting material is foamed can also be expressed in terms of the volume fraction of voids that it contains, and this can be as low as 0.5. However, in practice the volume fraction of voids is often not less than 0.9, so that the range can for instance be from 0.95 to 0.985, for instance from 0.96 or 0.97 to 0.98. A volume fraction of voids of 0.5 is equal to a ratio of the volume of foam over the volume of thermoplastic material it contains of two to one.

In general in the production of the extruded foamed thermoplastic material the blowing agent will be a low boiling substance or a chemical blowing agent. The foamed material usually contains closed cells, although material (for instance polyethylene) can be employed which contains cells which to some extent are interconnecting or "open." In many instances the agent is a volatile substance, and is often one that is a gas or vapor under normal atmospheric conditions (such as 20° C. and 1 atmosphere pressure), but which while under pressure before extrusion will be present in solution in the molten or semimolten thermoplastic material. The blowing agent can however be one, such as pentane or a pentane fraction, which is a volatile liquid under normal conditions. Examples of volatile substances that can be used include lower aliphatic hydrocarbons, such as methane, ethane, ethylene, propane, a butane, or a pentane; lower alkyl halides, such as methyl chloride, trichloromethane or 1.2-dichlorotetrafluoroethane; acetone; and inorganic gases, such as carbon dioxide or nitrogen. The lower aliphatic hydrocarbons, especially butane, are useful in respect of polyolefinic materials, such as polystyrene and polyethylene. The blowing agent can also be a chemical blowing agent, which can for example be a bicarbonate such as for example sodium bicarbonate or ammonium bicarbonate, or an organic nitrogen compound that yields nitrogen on heating, such as for example dinitrosopentamethylenediamine or barium azodicarboxylate. From 3% to 30%, especially 7% to 20%, by weight based on the weight of the thermoplastic material is often a suitable proportion of blowing agent, and for example the use of from 7% to 15% by weight of butane in conjunction with a polyolefinic material has given excellent results. Sometimes the blowing agent will be employed in conjunction with a nucleating agent, which assists in the formation of a large number of small cells. A wide range of nucleating agents can be employed, including finely divided inert solids such as for example silica or alumina, perhaps in conjunction with zinc stearate, or small quantities of a substance that decomposes at the extrusion temperature to give a gas can be used. An example of the latter class of nucleating agents is sodium bicarbonate, used if desired in conjunction with a weak acid such as for example tartaric acid or citric aid. A small proportion of the nucleating agent, for example up to 5% by weight of the thermoplastic material, is usually effective. A plasticiser can also be present where this is appropriate.

The extruded foamed thermoplastic material is drawn, and in doing so it is orientated unidirectionally and the cells of the foam are elongated. In practice it is convenient to draw the foam along the direction in which it has been extruded (that is to say it is drawn uniaxially), but if desired appropriate arrangements can be made for the foamed material to be drawn in a direction for example at right angles to the direction of extrusion. The drawn material usually has a slightly higher density than the material before drawing.

The precise conditions that are necessary in the drawing operation to achieve the required results depend on the particular thermoplastic material that is employed, but in general draw-down ratios of from 20:1 to 2:1 have been found useful, for example from 15:1 to 3:1. Good results have been obtained with a ratio between 12:1 and 5:1, for instance from 10:1 to 7:1. The temperature employed again depends on the particular thermoplastic material, but it is an elevated one in most instances, for example above 40° C. or 50° C. and up to 130° C. or 140° C. or rather more in some cases. A temperature in the range of 80° C. to 100° C., such as about 90° C., is often useful. In principle it is desirable for the foamed material to be heated to a moderately elevated temperature, not high enough to damage the foam structure but high enough for the material to be sufficiently ductile. For instance extruded foamed polystyrene can be drawn at from 120° C. to 140° C. while for foamed high density polyethylene a temperature between 40° C. and 100° C. is preferable. An amorphous thermoplastic material should normally be drawn above its glass transition temperature, whilst a crystalline thermoplastic material can be drawn at a temperature lower than its crystalline melting point. If the foamed material is still hot from the extrusion operation it may need to be cooled before it is possible to draw it in a subsequent operation, but in the more normal course of events a foamed material needs to be heated to a suitable temperature before it can be drawn, because for example even in a continuous operation the temperature of the foamed material can have dropped too low by the time it is possible to draw it. The heat treatment that is applied is as has been explained such that the extruded foam is sufficiently ductile to be drawn, and this can involve for instance either heating the foamed material at a steady temperature, or subjecting it to a relatively high temperature (perhaps as high as 200° C.) for a short time followed by a period (normally longer) at a lower temperature. For example a foamed material that is produced in a form which has an outer "skin" of material (which has a higher density than the inner material) may give better results with a heat treatment which involves a short initial period at a higher temperature. This initial treatment can be useful in the instance of a thermoplastic material such as crystalline polypropylene, and can be as short as a few seconds. The precise conditions necessary in order to ensure that a foamed material is in a condition suitable for drawing can easily be found by simple experiments. In general any convenient method of applying heat can be employed. For example the extruded foamed material can be passed through hot air or some inert gas or through a heated bath of a suitable inert liquid, such as water, glycerol or ethylene glycol. In certain instances the drawing can be performed at room temperatures, for example with nylon materials.

After the foamed thermoplastic material has been drawn it is partially disintegrated, that is, it is broken down into the three dimensional structure of interconnected fiber elements. In this operation the walls of the elongated cells of thermoplastic material are broken down or "fibrillated" to give fiber elements. The solid three-point connections at the ends of the cells are in some instances the junction points of a number of interconnecting fiber elements. The disintegration can for example be effected by mechanically working the drawn material so that some shear is applied to it, preferably in a transverse direction, and several ways of doing this can be employed, including rubbing, rolling, twisting, shaking, beating or otherwise subjecting the material to forces tending to draw it laterally at right angles to the direction of orientation. For example there can be employed a reciprocating "nip" in conjunction with an adjacent stationary nip, as is described in the parent specification. Other methods can entail use of two cylindrical brushes, one stationary and one revolving; a hammer mill; and moving rubber surfaces, in the form of plates, belts or rolls. One form of suitable fibrillation apparatus is for example described in British Pat. Specification No. 4486/67. Ultrasonic vibrations can also be used, or suitably directed jets of air. A preferred method, particularly where the ultimate product is a yarn, is described in British Pat. Specification No. 51479/66 and comprises subjecting the drawn foamed material to the action of a turbulent stream of fluid, such as for example air.

In general in the instance of thermoplastic resins the temperature at which the partial disintegration is carried out is room temperature, 20° C., or somewhat higher perhaps up to 30° C. In the instance of certain specific thermoplastic resins (particularly those which possess a degree of elasticity and are therefore relatively tough), and of elastomeric materials in general, the temperature used is normally lower than room temperature, for instance 5° C. or 0° C. or even lower.

A variety of methods can be employed to treat the structure of interconnected fiber elements so that they adopt the desired inclined attitude. A preferred method comprises producing the structure from a thermoplastic material comprising a mixture of two or more components and treating the structure so as to effect a differential dimensional change in the components of the mixture. This method results in texturing where adjacent fiber elements or adjacent parts of the same fiber element are of differing compositions, and, in the latter case at least, there is achieved the preferred condition that the fiber elements have an inherent tendency to bend or curl. Where adjacent fiber elements are of differing compositions, those that become smaller than their interconnected neighbors as a result of the differential change pull these neighbors into a crimped configuration. As components of the mixture there can for example be employed mutually incompatible dissimilar materials such as polyethylene and polystyrene, or, more surprisingly, more compatible materials that do not differ greatly in composition from one another. For example there can be employed a mixture of a homopolymer of a monomer and a copolymer of a major amount of that monomer with another monomer, or a mixture of two or more copolymers containing a common comonomer, or a mixture of copolymers containing the same monomers but in differing proportions. Specific examples of suitable mixtures are a mixture of a polyethylene and polypropylene, a mixture of polyethylene or polypropylene and a copolymer of ethylene with vinyl acetate (for instance a copolymer containing from 5% to 20% by weight of vinyl acetate), a mixture of polyacrylonitrile and a copolymer of acrylonitrile with vinyl acetate, or a mixture of two copolymers of acrylonitrile with vinyl acetate in differing proportions (for instance containing respectively 93% and 90% by weight of acrylonitrile). Very often the mixture will consist of two components, and, although these can be present in approximately equal proportions, it is often preferred for the amount of one to be much greater than that of the other. The proportion of a minor component can thus be quite small, for instance 0.5% by weight or less of the total. Very often a proportion from 1% to 20% of the total is suitable, for example from 1% to 10%, although a higher proportion, for example 40% or almost 50% can be used if desired. Generally it is more convenient if the necessary dimensional change is a shrinkage, which can for instance result from a relaxation of the orientation stresses produced on drawing. This can for instance be achieved by choosing the components of the mixture of thermoplastic materials so that they have differing rigidities, a minor component preferably preferably less rigid than a major component, and subjecting the fiber assembly to an appropriate elevated temperature to effect the required differential shrinkage. Preferably the softening point of a minor component is lower than that of a major component, and often good results are obtained where a major component becomes sufficiently flexible to permit the fiber elements to curl near the softening point of a minor component, so that on cooling the curl becomes set under the influence of the contracted minor component. Preferably the Vicat softening points of the components differ by between 5° C. and 50° C., for example by from 10° to 25° C. The elevated temperature is preferably close to the softening point of the lower-melting component of the mixture of thermoplastic materials. Where it is above this softening point it should of course not be above that of the mixture as a whole; otherwise the structure of interconnected fiber elements would be destroyed. Within these limits, the use of a higher temperature has been found to increase the degree of texturing obtained. For example, temperatures from 80° C. to 100° C. have successfully been employed with a mixture of polyethylene of softening point 105° C. and an ethylene/vinyl acetate copolymer of softening point 80°–85° C. As an alternative to differential shrinkage, it is possible to employ a differential swelling, for example resulting from the application of water to a fiber assembly produced from a mixture of thermoplastic materials comprising a polymer or copolymer of vinyl alcohol.

A differential shrinkage in adjacent fiber elements, which results in those undergoing less shrinkage to be pulled into an inclined attitude, can be achieved by subjecting some of the fiber elements to an appropriate elevated temperature so as to cause them to shrink; for example a suitably directed fine jet of hot gas or vapor, preferably of air or steam, can be used for this purpose.

Another very suitable method of texturing the fiber assembly, particularly a yarn, generally comprises deforming it into a crimped configuration and setting it in this configuration by for example heating and cooling. The deformation can be effected in various ways, for example by knitting a yarn into a fabric, by passing between knurled or corrugated wheels or rollers, by twisting or false twisting, or by compressing the folded material into a confined space. The deformed fiber assembly can then be subjected to a suitable elevated temperature and cooled to allow it to be set in the crimped configuration. Generally, the elevated temperature chosen is sufficient to achieve at least a partial relaxation of the orientation stresses that result from the drawing operation, but not sufficient to destroy the identity of the interconnected fiber elements. Usually a temperature between about 5° to 50° C. lower than the softening point of the thermoplastic material, preferably between 10° and 40° C. lower than the softening point, is found suitable, and in any particular case the best temperature to employ can be determined by means of a few simple tests. Excellent results have been obtained in the texturing of polypropylene fiber assemblies by this method. It has been found that although a polyethylene fiber assembly can be textured in this way, there can be some tendency for much of the texture to be irrecoverable after tension, and one of the previously described methods is therefore recommended in such a case. A crimping operation as described in this paragraph can if desired be repeated one or more times so as to give a more highly textured effect.

Texturing by any of the methods described above can often desirably be followed by a second fibrillation operation which gives rise to a softer, bulkier but less tightly textured product containing less interconnection between fiber elements and sometimes a proportion of loose ends. This product can if desired be again textured to give a particularly bulky product.

The new fiber assemblies generally have a pleasingly rough texture and the inclined attitude of the fiber elements is normally readily apparent. The new fiber assemblies are better able to resist transverse compression than the untextured ones from which they are derived, and this results in their possessing greater bulk and springiness of handle, although they may be less flexible. They also in general possess excellent stretch properties, being often able to recover substantially immediately from an extension of 10%, and in some cases of up to 50%, in the direction of alignment of the fiber elements.

The invention is illustrated by the following Examples.

EXAMPLE 1

This Example describes a textured yarn according to the invention comprised of a mixture of polyethylene and a minor proportion of a copolymer of ethylene and vinyl acetate.

Forty-five pounds Pounds of granular polyethylene of density 0.96 and melt index 0.9 were dry-blended with 5 pounds of a granular copolymer, of melt index 4.0, of 88% by weight of ethylene with 12% by weight of vinyl acetate, and the resulting mixture was fed to an extruder of barrel diameter 1.5 inch. Butane was injected into the extruder barrel at a rate corresponding to 15% by weight of the mixture, and extrusion took place through a circular orifice of diameter one-sixth inch at a temperature 130° C. to give a foamed strand of diameter 0.3 inch. This was drawn at 90° C. to a draw radio 8:1, and the drawn strand was fibrillated by subjecting it to a jet of turbulent air.

The fibrillated strand (illustrated in FIG. III in the form it assumed after being subjected to tension and relaxation as defined above) was passed through a hot air cabinet at 95° C., the length of its path through the cabinet being 5 feet and its speed 10 feed per minute. It was allowed to shrink without tension while within the cabinet.

There was a produced a textured yarn, illustrated in FIG. IV in the form it assumed after similarly being subjected to tension and allowed to relax as defined above. It consisted of a mass of fiber elements interconnected in three dimensions at a large number of points and many of them having an inherent tendency to buckle into an irregular wavelike configuration. There were very few loose ends of fibers present. Nearly all of the fiber elements were inclined to the yarn axis at angles up to 90°, and, although many of the fiber elements were inclined at angles 45° or less to the length of the yarn, (there were many changes of direction and many "bridging" or interconnecting fiber elements that were not parallel to the main body of fiber elements). The fiber elements had an average mean thickness of about 0.0003 inch, and their appearance was substantially as shown in FIGS. VII and VIII.

The textured yarn was of 2050 denier. It had excellent strength and elasticity, having a breaking strength of 5.4 pounds weight (corresponding to 1.2 gram per denier), and recovering half of an extension of 10%. It had a rough appearance similar to that of wool, although more lustrous, and retained this characteristic when under tension.

A sample of the yarn was twisted to the extent of 10 turns per inch to give a twisted yarn with an average diameter of 0.026 inch. Again this had excellent elasticity and a strength of 8.6 pounds weight, corresponding to about 2 grams per denier.

In contrast, the intermediate untextured yarn was limp and had very little elasticity. It was smooth in feel and appearance.

EXAMPLE 2

This Example describes further textured yarns according to the invention.

In a series of experiments, the procedures described in Example 1 were repeated using smaller or larger quantities of the copolymer and various extrusion, drawing and texturing temperatures as mentioned in the table below. The last column of the table gives an estimate of the extent to which texturing had taken place being the linear extension obtained when the relaxed yarn was subjected to tension as defined above.

| Experiment | EVA proportion in mixture, percent | Temperatures | | | Extent of texturing, percent |
|---|---|---|---|---|---|
| | | Extrusion | Drawing | Texturing | |
| A | 1 | 137 | 90 | 90 | 8.0 |
| B | 10 | 135 | 90 | 85 | 7.5 |
| C | 10 | 135 | 90 | 100 | 10-12 |
| D | 20 | 141 | 85 | 85 | 7.5 |
| E | 40 | 131 | 80 | 80 | 7.0 |

In all the experiments, the resulting yarns were similar in structure to that produced in Example 1.

EXAMPLE 3

This Example describes a different method according to the invention for the production of a textured polypropylene yarn.

A foamed 100% polypropylene strand was first extruded, drawn and fibrillated by a method similar to that described in Example 1. The polypropylene used was of melt index 0.3, the extrusion temperature was 185° C. and the drawing temperature was 100° C. The fibrillated strand was then hand-knitted into a fabric, using a stocking stitch at 10 stitches and rows per inch, and the fabric was then placed in the hot-air cabinet at 135° C. for 60 seconds.

After the fabric had cooled to room temperature it was unraveled and there resulted a textured yarn in which the crimps (about 30%–40%) introduced by the stitches had become set.

EXAMPLE 4

This Example describes a further method according to the invention for the production of a textured polypropylene yarn.

A foamed polypropylene strand was first extruded, drawn and fibrillated by the method described in Example 3. The fibrillated strand was then moved longitudinally past a fine jet of hot air directed so that some but not all of the fiber elements were subjected to its action. The air temperature being 130° C. and the speed of the strand relative to the position of the jet 10 feet per minute.

It was found that some of the fiber elements had shrunk, causing the remainder to pucker and bend into various inclined attitudes, the degree of texturing being about 10%.

EXAMPLE 5

This Example describes a further method according to the invention for the production of textured polypropylene yarns.

A foamed polypropylene strand was first extruded, drawn and fibrillated by the method described in Example 3, and a length of the fibrillated strand was then packed tightly into a 10 inch length of copper pipe of internal diameter one-fourth inch. The tube and its contents were then heated to 125° C. for 2 minutes and allowed to cool to room temperature.

On removal of the resulting textured yarn (illustrated in FIG. V) it was found to have acquired a highly crimped configuration, the degree of texturing being about 50%–60%.

When a sample of the textured yarn was passed once more through the fibrillation apparatus it became softer and as a whole more loosely crimped and some loose ends were produced. The product is illustrated in FIG. VI.

EXAMPLE 6

This Example describes a further method according to the invention for the production of a textured polypropylene yarn.

A foamed polypropylene strand was first extruded, drawn and fibrillated by the method described in Example 3, and the fibrillated strand was then passed through the nip between a pair of knurled wheels heated to 120° C., the knurling having a pitch and depth of 0.03 inch.

The resulting textured yarn was found to have acquired a crimped configuration.

I claim:

1. A process for the production of textured fiber assembly comprising the steps of forming a cellular thermoplastic material with the cell walls having been formed by the expansion of a blowing agent, said thermoplastic material comprised of a mixture of polyethylene and a copolymer of ethylene and vinyl acetate, drawing said foamed thermoplastic material in a given direction to orient said material and increase its strength in the direction of draw, subjecting the drawn foamed material to forces such that the walls of the foam are broken down and converted into a three-dimensional structure of interconnected fiber elements, said fiber elements being comprised of said polyethylene and said copolymer so that the fiber elements are provided with an inherent tendency to bend or curl and heat treating said structure to differentially shrink the polymers comprising the material so that a portion of the fiber elements adopt an inclined attitude.